United States Patent
Muraoka et al.

(10) Patent No.: US 8,343,666 B2
(45) Date of Patent: Jan. 1, 2013

(54) NONAQUEOUS ELECTROLYTE SECONDARY BATTERY

(75) Inventors: Yoshiyuki Muraoka, Osaka (JP); Takuya Nakashima, Osaka (JP); Kiyomi Kozuki, Osaka (JP); Masatoshi Nagayama, Osaka (JP)

(73) Assignee: Panasonic Corporation, Osaka (JP)

( * ) Notice: Subject to any disclaimer, the term of this patent is extended or adjusted under 35 U.S.C. 154(b) by 1667 days.

(21) Appl. No.: 10/586,602

(22) PCT Filed: Jan. 13, 2006

(86) PCT No.: PCT/JP2006/300343
§ 371 (c)(1),
(2), (4) Date: Jul. 20, 2006

(87) PCT Pub. No.: WO2006/075684
PCT Pub. Date: Jul. 20, 2006

(65) Prior Publication Data
US 2008/0213668 A1 Sep. 4, 2008

(30) Foreign Application Priority Data

Jan. 14, 2005 (JP) .................................. 2005-007401
Dec. 28, 2005 (JP) .................................. 2005-377954

(51) Int. Cl.
*H01M 4/13* (2010.01)
*H01M 4/02* (2006.01)
(52) U.S. Cl. ................. 429/231.95; 429/209; 429/218.1
(58) Field of Classification Search .......................... None
See application file for complete search history.

(56) References Cited

U.S. PATENT DOCUMENTS

| | | | |
|---|---|---|---|
| 4,943,497 A * | 7/1990 | Oishi et al. ..................... 429/53 |
| 5,871,863 A | 2/1999 | Tsutomu |
| 6,387,564 B1 * | 5/2002 | Yamashita et al. ............ 429/132 |
| 2001/0038949 A1 * | 11/2001 | Hatazaki et al. ............... 429/324 |
| 2003/0082448 A1 | 5/2003 | Cho et al. |
| 2003/0082452 A1 | 5/2003 | Ueda et al. |
| 2003/0087154 A1 * | 5/2003 | Ohzuku et al. ............. 429/231.1 |
| 2004/0058244 A1 | 3/2004 | Hosoya et al. |
| 2004/0076882 A1 * | 4/2004 | Hosoya et al. ................ 429/223 |

FOREIGN PATENT DOCUMENTS

| | | |
|---|---|---|
| JP | 08-213015 | 8/1996 |
| JP | 09-180718 | 7/1997 |

(Continued)

OTHER PUBLICATIONS

IPDL JPO Machine Translation for Uenae, JP 2004-362777, (Dec. 2004).*

Primary Examiner — Barbara Gilliam
Assistant Examiner — Adam A Arciero
(74) Attorney, Agent, or Firm — McDermott Will & Emery LLP

(57) ABSTRACT

A nonaqueous electrolyte secondary battery has a positive electrode including an active material of complex oxides capable of storing and emitting lithium ions, a negative electrode, a separator, and an electrolytic solution made of a nonaqueous solvent. A discharge curve of this battery when being discharged with a constant power has two or more points of step-like flections near the end of electrical discharge in a range of 5% to 20% of a discharge capacity thereof as determined from an initial discharge voltage in a state of full charge to a discharge-end voltage.

2 Claims, 2 Drawing Sheets

FOREIGN PATENT DOCUMENTS

| | | |
|---|---|---|
| JP | 09-266011 | 10/1997 |
| JP | 09-293538 | 11/1997 |
| JP | 11-233148 | 8/1999 |
| JP | 2001-076727 | 3/2001 |
| JP | 2003-007299 | 1/2003 |
| JP | 2003-173776 | 6/2003 |
| JP | 2003-238165 | 8/2003 |
| JP | 2003-346799 | 12/2003 |
| JP | 2004-134207 | 4/2004 |
| JP | 2004-179085 | 6/2004 |
| JP | 2004-235144 | 8/2004 |
| JP | 2004-265806 | 9/2004 |
| JP | 2004-335186 | 11/2004 |
| JP | 2004-335278 | 11/2004 |
| JP | 2004-362777 | 12/2004 |
| JP | 2004362777 A * | 12/2004 |

* cited by examiner

NONAQUEOUS ELECTROLYTE SECONDARY BATTERY

RELATED APPLICATION

This application is a national phase of PCT/JP2006/300343 filed on Jan. 13, 2006, which claims priority from Japanese Application No. JP 2005-007401 filed on Jan. 14, 2005 and Japanese Application No. JP 2005-377954 filed on Dec. 28, 2005 the disclosures of which Applications are incorporated by reference herein. The benefit of the filing and priority dates of the International and Japanese Applications is respectfully requested.

TECHNICAL FIELD

The present invention relates to a nonaqueous electrolyte secondary battery capable of discharging a large current, with a high capacity and an excellent cycle characteristic.

BACKGROUND ART

In recent years, nonaqueous electrolyte secondary batteries are often used as main power sources of mobile apparatuses such as mobile telecommunications devices and portable electronic devices since they can provide high energy density at high voltage. There are also demands recently for nonaqueous electrolyte secondary batteries of light-weight and small size, yet capable of delivering large discharge currents because of the needs for installing them in automobiles, and for use with direct current-driven heavy tools.

Despite of these demands, nonaqueous electrolyte secondary batteries usually result in temperature rises due to increase in heat generated by the Joule effect when large currents are discharged since the batteries have internal direct current resistances. Generally, nonaqueous solvent in an electrolytic solution used for the nonaqueous electrolyte secondary batteries contains a component that boils or resolves when the temperature exceeds about 90° C. For this reason, charge and discharge capacity decreases drastically when repeating such a cycle that causes the battery temperature to exceed 90° C. during charging and discharging. Numerous studies are being made in efforts to solve such a problem.

An internal resistance of any battery is divided into a reactive resistance related to reaction of the battery, a resistance attributable to the electrolytic solution and separator, and a resistance of current collectors. In order to lower the resistance of current collectors among these resistances, there is a work disclosed in Japanese Patent Unexamined Publication, No. H11-233148, for example, which decreases the direct current resistance of battery by improving a structure of connections of a positive electrode and a negative electrode to exterior parts. This work is aimed at reducing the Joule heat generated inside the battery. An electric power (i.e., output power) is the product of a current and a voltage. Therefore, in the case of an apparatus requiring a high power by way of constant power discharge, such as a power tool, there occurs a rise in the discharge rate (i.e., discharge current) when the voltage decreases quickly near the end of electric discharge. Since the decrease in voltage is attributed to a material of the positive electrode, the above technique of decreasing the direct current resistance does not provide a direct effect in this case.

There is also an idea of installing a temperature sensor on a surface of the battery, and using a control to stop operation of an apparatus when a surface temperature of the battery reaches a predetermined value or higher, as disclosed in Japanese Patent Unexamined Publication, No. 2004-179085, for example. Besides the electrolytic solution, however, nonaqueous electrolyte secondary batteries contain other materials that generate heat under high temperatures, such as an active material for positive electrode in the end of electric discharge. In other words, the active material for the positive electrode generates a large amount of heat by reaction if it is discharged to a low voltage potential. There is thus a possibility that the battery becomes overheated if the predetermined control temperature is set too high in the above control. On the other hand, the discharge capacity decreases drastically if the predetermined control temperature is set too low.

In addition, there is another idea of deterring the drastic decrease in voltage near the end of electrical discharge by using two kinds of active materials having different ranges of average discharge voltage for the positive electrode as disclosed, for example, in Japanese Patent Unexamined Publication, No. H09-180718. In an example that uses such active materials for the positive electrode, there gives rise to a problem described hereafter when a large current is discharged as in the case of power tools. That is, the battery comes to a discharge-end voltage due to a rise in electrical potential of the negative electrode in reality at the end of electrical discharge, even though it is intended to bring the battery voltage to the discharge-end voltage by decreasing an electrical potential of the positive electrode. This impedes the effect of voltage control by means of the discharge voltage in the positive electrode, and thereby it makes the battery in the state of overheating near the end of electric discharge. As a result, it makes a reduction of designed capacity since it becomes necessary to increase an irreversible capacity of the positive electrode larger than that of the negative electrode in order to avoid this problem.

SUMMARY OF THE INVENTION

The present invention is directed to address the above problems, and it is an object of this invention to provide a nonaqueous electrolyte secondary battery capable of delivering a large capacity while avoiding generation of heat substantially in the end of electrical discharge especially in such application as power tool that requires a large discharge current. The nonaqueous electrolyte secondary battery of this invention has a positive electrode, a negative electrode, a separator disposed between the positive electrode and the negative electrode, and an electrolytic solution containing a nonaqueous solvent. The positive electrode includes complex oxides capable of storing and emitting lithium ions, as an active material. The negative electrode can also store and emit lithium ions. A discharge curve of this battery when being discharged with a constant power has two or more points of step-like flection near the end of electrical discharge in a range of 5% to 20% of its discharge capacity as determined from an initial discharge voltage in a state of full charge to a discharge-end voltage. The structure composed in this manner can moderate a rate of voltage decrease as well as a rate of current increase in the end of discharge, thereby providing the nonaqueous electrolyte secondary battery with an advantage of reducing a steep rise in temperature of the battery when being discharged by drawing a large current. In addition, the nonaqueous electrolyte secondary battery of the present invention uses a positive electrode containing a mixture of at least two kinds of lithium-based complex oxides having different average discharge voltages as active materials. One of the active materials having the lowest average discharge voltage is so mixed that its amount in capacity comes to 5% or more but not more than 20% of that of the total amount of the active materials. The structure composed in this manner achieves a discharge curve having a point of step-like flection, so as to moderate the rate of voltage decrease as well as the rate of current increase in the end of discharge, thereby providing the nonaqueous electrolyte secondary battery with the advantage of reducing the steep rise in temperature of the battery when being discharged with a large current.

DETAILED DESCRIPTION OF THE PREFERRED EMBODIMENTS

Figure 1:
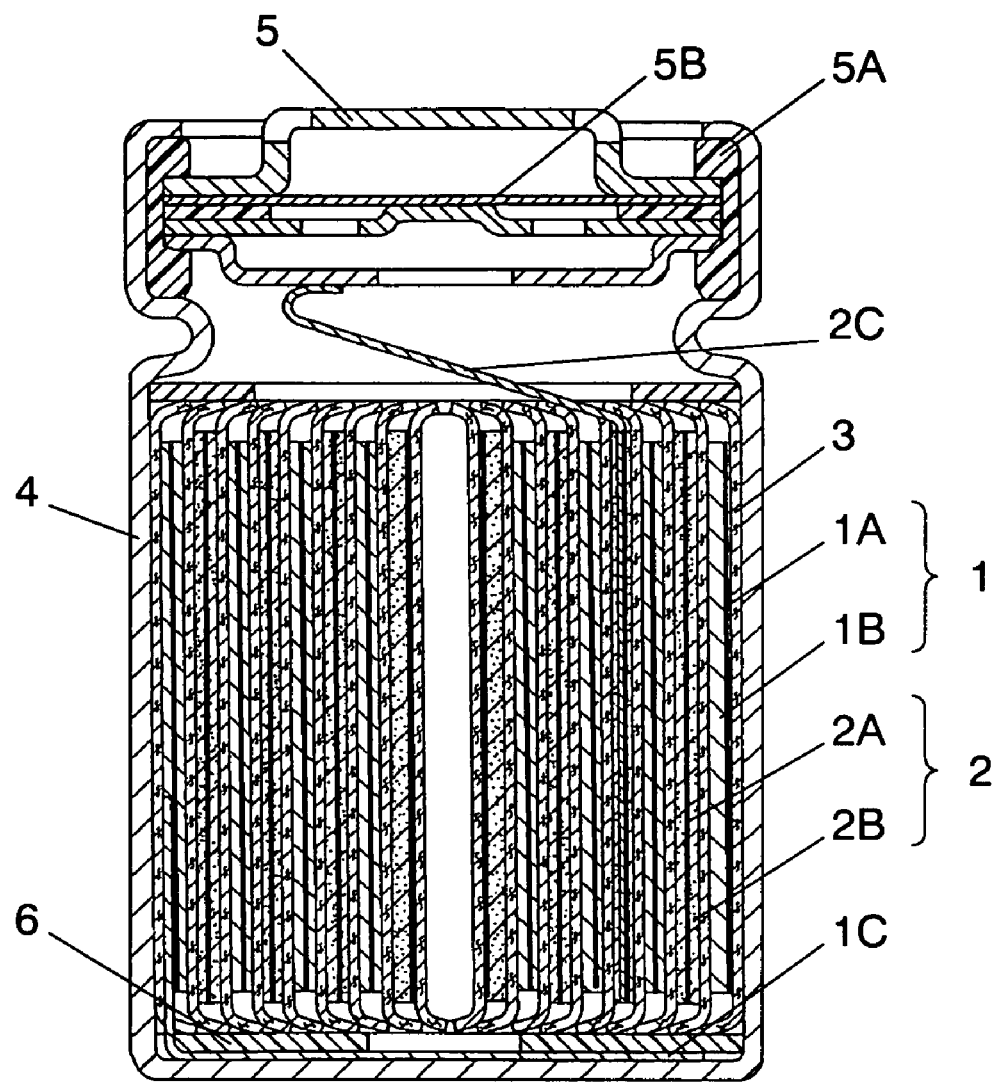
FIG. 1 is a sectional view of a nonaqueous electrolyte secondary battery according to an exemplary embodiment of the present invention.

FIG. 1 is a sectional view of a cylindrical battery representing one example of a nonaqueous electrolyte secondary battery according to an exemplary embodiment of the present invention. In this battery, an electrode block having negative electrode 1, positive electrode 2, and separator 3 disposed between these electrodes to prevent them from becoming a direct contact, which are then wound together and placed inside battery case 4. Negative electrode 1, positive electrode 2 and separator 3 are impregnated with an electrolytic solution (not show) containing a nonaqueous solvent. An opening of battery case 4 is closed with sealing plate 5, to hence complete the structure of this sealed type battery.

Negative electrode 1 has collector 1A, mixture layer 1B containing a negative electrode active material and disposed over collector 1A, and lead wire 1C connected to collector 1A. A carbon material, a crystalline or non-crystalline metal oxide, and the like material are capable of storing and emitting lithium, and therefore used as the active materials contained in mixture layer 1B. The carbon material may be any of ingraphitizable carbon materials such as coke and glassy carbon, and any of graphite made of a highly crystallized carbon material having a grown crystalline structure, to name a few. More specifically, the usable material includes any of pyrolytic carbons, cokes (e.g., pitch coke, needle coke, petroleum coke, and the like), graphite, glassy carbons, burned products of organic polymer compounds (e.g., a phenol resin, a furan resin, etc. which are burned and carbonized at a proper temperature), carbon fibers, activated carbons, and so on. It is desirable to use a material having the small irreversible capacity among them because that is the one meeting the spirit of this invention.

Mixture layer 1B is obtained from a paste formed by mixing the negative electrode active material, a binder and a solvent, which is coated on collector 1A, and dried. An electrically conductive material such as carbon black may be added to the paste as needed. Mixture layer 1B also be roll-pressed after it is dried. The binder can be any of the ordinary binding agents known to be used for this kind of batteries. Specific examples include polyethylene, polypropylene, poly-tetrafluoroethylene, poly-vinylidene fluoride, styrene butadiene rubber, and the like. Collector 1A and lead wire 1C can be composed of a metal such as copper and nickel.

Positive electrode 2 has collector 2A, mixture layer 2B containing a positive electrode active material and disposed over collector 2A, and lead wire 2C connected to collector 2A. Mixture layer 2B is obtained from a paste made by mixing the positive electrode active material, a binder and a solvent, which is coated on collector 2A, and dried. An electrically conductive material such as carbon black and graphite may be added to the paste as needed. Mixture layer 2B may also be roll-pressed after it is dried. The binder can be the same material as is used for negative electrode 1. Collector 2A and lead wire 2C may be composed of a metal such as aluminum, stainless steel, and titanium.

The electrolytic solution can be obtained by dissolving supporting salt into nonaqueous solvent. For the nonaqueous solvent, a solvent having a comparatively high dielectric constant and not easily resolvable by the graphite composing negative electrode 2, such as ethylene carbonate (hereinafter referred to as "EC"), ethyl-methyl carbonate (referred to as "EMC"), dimethyl carbonate (referred to as "DMC"), and the like materials are used as a primary solvent. It is desirable to use EC as the primary solvent especially when negative electrode 2 is made of a graphite material. However, it is also possible to use a compound of EC in which a halogen element is substituted for a hydrogen atom. Alternatively, although propylene carbonate (referred to as "PC") is reactive to graphite material, it can provide a better characteristic when a part of it is replaced with a second element solvent, as compared to the primary solvent of EC or a compound of EC of which the halogen element is substituted for the hydrogen atom. In addition, it is also desirable to use the nonaqueous solvent together with another solvent of low viscosity, which increases the conductivity to improve a current characteristic, and reduces its reactivity to a lithium metal to thereby improve safety.

On the other hand, the supporting salt can be of any type of lithium salt without limitations so long as it is dissolvable in the nonaqueous solvent and shows an ionic conductivity. For example, $LiPF_6$, $LiClO_4$, $LiAsF_6$, $LiBF_4$, $LiB(C_6H_5)_4$, $LiCH_3SO_3$, $CF_3SO_3Li$, $LiCl$, $LiN(CnC_{2n+1}SO_2)_2$, $LiBr$, etc. can be used. It is especially desirable to use $LiPF_6$ as the supporting salt. Any one of these supporting salts may be used singly, or two or more of them may be used as a mixture.

A material usable for battery case 4 can be iron, nickel, stainless steel, aluminum, titanium, and the like. Battery case 4 may be treated with plating or the like to prevent electrochemical corrosion by the nonaqueous electrolyte during electric charges and discharges of the battery.

In a process of manufacturing the nonaqueous electrolyte secondary battery constructed as above, negative electrode 1 and positive electrode 2, both having a ribbon-like shape as described above are put together with separator 3 made of a micro-porous polyethylene film, for example, placed between them. They are then rolled along their longitudinal direction in many times to form an electrode block of wound type. This electrode block is placed inside battery case 4 made of iron, of which an interior is nickel plated, and electrically insulating plate 6 being inserted in the bottom thereof. One end of lead wire 1C is welded to battery case 4 to collect an electric current from negative electrode 1. This makes battery case 4 in electrical continuity with negative electrode 1 to provide a negative terminal of the nonaqueous electrolyte secondary battery. Furthermore, one end of lead wire 2C is electrically connected with sealing plate 5 through current-break sheet 5B to collect an electric current from positive electrode 2. Current-break sheet 5B has a function to break the current in response to an internal pressure of the battery. This makes sealing plate 5 in electrical continuity with positive electrode 2 to provide a positive terminal of the nonaqueous electrolyte secondary battery.

After the inner space of battery case 4 is filled with the electrolytic solution prepared by dissolving the supporting salt in the nonaqueous solvent, sealing plate 5 is inserted in the opening of battery case 4. Battery case 4 is then crimped over gasket 5A made of an insulation resin coated with a sealan, and to complete the cylindrical nonaqueous electrolyte secondary battery on which sealing plate 5 is secured.

It is desirable for this nonaqueous electrolyte secondary battery to be equipped with current-break sheet 5B, which acts as a safety valve to release gases from the inside if a pressure builds up beyond a predetermined value as described.

Description is provided next of the positive electrode active material contained in mixture layer 2B. A discharge curve of this nonaqueous electrolyte secondary battery when being discharged with a constant power has two or more points of step-like flection near the end of electrical discharge in a range of 5% to 20% of its discharge capacity as determined from an initial discharge voltage in the state of full charge to a discharge-end voltage. These points of step-like flection here mean points that indicate boundaries between two phases where a discharge mechanism changes from one to the other, or points where an inclination of voltage drop becomes steep near the end of electric discharge.

Such a discharge curve can be achieved by composing the positive electrode active material as described hereinafter. The positive electrode active material is obtained by mixing at least two kinds of lithium-based complex oxides having different average discharge voltages. That is, positive electrode 2 has the positive electrode active material which includes at least a first active material of lithium-based complex oxide and a second active material of another lithium-based complex oxide having a lower average discharge voltage than that of the first active material. The second active material is so added that its amount in capacity comes to 5% or more but not more than 20% of a total amount of capacity of the active materials. The structure composed in this manner thus achieves the discharge curve having points of the step-like flection. Such a discharge characteristic gives a moderate rate of voltage decrease near the end of electric discharge. As a result, it moderates a rate of current increase near the end of electric discharge, and reduces a steep rise in temperature of the battery when being discharged with a large current. In the nonaqueous electrolyte secondary battery composed as described above, since the internal temperature can be checked more accurately with a temperature sensor, it helps ease control of the electric charges and discharges, and thereby prolongs a usable life of the battery.

It is conceivable that combinations of such active materials include a combination of $Li_{0.98}CoO_2$ and $LiMnO_2$, another combination of $Li_{0.98}CoO_2$ and $LiNi_{1/3}Mn_{1/3}Co_{1/3}O_2$, and the like combinations. In this instance, a combination of a composite "A" expressed as $Li_xMO_2$ (where "M" denotes a 3d transition metal) as the first active material, and another expressed as $LiMnO_2$, having an average discharge voltage of 2 to 3V as the second active material can make the decrease in voltage most gently near the end of electric discharge, thereby alleviating most the drastic rise in temperature of the battery.

It is further desirable that the composite "A" expressed as $Li_xMO_2$ (where "M" denotes a 3d transition metal) satisfies $0.9 \leq x \leq 0.98$. A designed capacity of the battery decreases substantially in proportion to a decrease in the theoretical capacity of the positive electrode if the x value is less than 0.9. If the x value exceeds 0.98, on the contrary, an irreversible capacity of the positive electrode decreases, and the battery comes to its discharge-end voltage due to a rise in voltage potential of the negative electrode. This impairs the effect of voltage control using the discharge voltage of the positive electrode, thereby causing the battery to heat up at the end of electric discharge.

It is also desirable that a ratio of $LiMnO_2$ by weight is at least 2% and at most 20% of the total amount of the active materials. If the ratio by weight of $LiMnO_2$ is less than 2%, it does not provide the effect of moderating the drastic decrease of voltage near the discharge-end voltage of 3.0 to 2.5V, and it consequently leads the battery to heat up at the end of discharge. If this ratio by weight of $LiMnO_2$ exceeds 20%, on the contrary, it does not provide a sufficient energy density since the average discharge voltage decreases substantially due to the excess amount of $LiMnO_2$. Moreover, it increases the discharge current as the average discharge voltage decreases when the battery is being discharged with a constant power. This increases generation of the Joule heat, which heats up the battery. This desirable range of adding amounts is also applicable to other materials besides $LiMnO_2$ when used as the active materials having the lowest value of average discharge voltage.

Furthermore, it is desirable that one of composites "A" is any of materials expressed as $Li_xNi_yMn_zCo_{1-y-z}O_2$ (where $0.9 \leq x \leq 0.98$, $0.3 \leq y \leq 0.4$, and $0.3 \leq z \leq 0.4$) and $Li_xNi_yCo_zAl_{1-y-z}O_2$ (where $0.9 \leq x \leq 0.98$, $0.55 \leq y \leq 0.8$, and $0.15 \leq z \leq 0.3$). Or, these materials may be combined together. Use of the above materials for composites "A" can further moderate the decreasing rate of discharge voltage near the end of electric discharge, and reduce the heat attributable to the drastic increase of discharge current.

The nonaqueous electrolyte battery of this invention is not limited to nonaqueous electrolyte secondary batteries of the type that uses nonaqueous electrolytic solution as the electrolyte, as described above, but it is also adaptable for use with an electrolyte of gelatinous type. In addition, the nonaqueous electrolyte secondary battery of this invention has no specific limitation in its shape, and it can be of any such shape as cylindrical, square, coin type, button type, and the like. It can also be fabricated into any size including thin and large dimensions.

In the nonaqueous electrolyte secondary battery according to this exemplary embodiment of the invention, description is now provided in detail of certain embodied examples, in which changes are made in compositions of active materials used for the positive electrodes Embodied Example 1

A positive electrode active material prepared here included a 90-weight portion of composite "A" in a powder form and a 10-weight portion of composite "B" also in a powder form as described hereinafter. A material used for composite "A" was $Li_{0.95}CoO_2$ obtained from $Li_2CO_3$ and $Co_3O_4$ which were mixed and burned for 10 hours at 900° C. A material used for composite "B" was $Li_{0.95}Ni_{0.35}Mn_{0.35}Co_{0.3}O_2$ obtained from $Li_2CO_3$, $Co_3O_4$, $NiO$ and $MnO_2$, which were mixed and burned for 10 hours at 900° C. A total of 100-weight portion of these active materials, a 2.5-weight portion of acetylene black as an electrically conductive material, and a 4-weight portion of poly-vinylidene fluoride as a binder were mixed together. This mixture was suspended in an aqueous solution of carboxymethyl-cellulose, and made into a paste form. This paste was coated on both surfaces of collector 2A made of an aluminum foil having 0.03 mm in thickness, and after having been dried it was roll-pressed to complete positive electrode 2 measuring 0.1 mm in thickness, 52 mm in width and 1,800 mm in length.

A material used as a negative electrode active material was made of mesophase spheres which were graphitized at as high a temperature as 2,800° C. (hereinafter referred to as mesophase graphite). This material was suspended in a styrene butadiene rubber emulsion having 1 wt-% of solid content and a hydroxyl-methyl cellulose solution also having 1 wt-% of solid content, and made into a paste form. This paste was coated on both surfaces of a copper foil having 0.02 mm in thickness, and after having been dried it was roll-pressed to complete negative electrode 1 measuring 0.1 mm in thickness, 57 mm in width and 1,860 mm in length.

Lead wire 2C made of aluminum and lead wire 1C made of copper were attached to positive electrode 2 and negative electrode 1 respectively. An electrode block was constructed thereafter by winding round them into a spirally-wound form together with separator 3 made of a polyethylene of 0.025 mm in thickness, 60 mm in width and 4,000 mm in length, placed therebetween. This block was inserted in battery case 4 of 26.0 mm in diameter and 65 mm in height. An electrolytic solution used was a solution containing $LiPF_6$ dissolved to a concentration of 1.25 mol/$dm^3$ in a solvent consisting of EC, EMC and DMC mixed to a ratio of 10:10:80 by volume. Battery case 4 filled with this electrolytic solution was provided with a temperature sensor mounted in the center area of the battery, and the opening was sealed to complete the battery with a nominal capacity of 2.5 Ah. This battery was identified as embodied example 1.

Embodied Example 2

A positive electrode active material prepared here included a 90-weight portion of composite "A" in a powder form and a 10-weight portion of composite "B" also in a powder form as described hereinafter. A material used for composite "A" was $Li_{0.95}CoO_2$ obtained from $Li_2CO_3$ and $Co_3O_4$ which were mixed and burned for 10 hours at 900° C. A material used for composite "B" was $Li_{0.95}Ni_{0.55}Co_{0.30}Al_{0.15}O_2$ obtained from $Li_2CO_3$, $Co_3O_4$, NiO and $Al_3O_4$, which were mixed and burned for 10 hours at 900° C. A battery similar to embodied example 1 was made with only differences as set forth above. This battery is identified as embodied example 2.

Embodied Example 3

A positive electrode active material prepared here comprises a 90-weight portion of composite "A" in a powder form and a 10-weight portion of composite "B" also in a powder form as described hereinafter. A material used for composite "A" was $Li_{0.95}CoO_2$ obtained from $Li_2CO_3$ and $Co_3O_4$ which were mixed and burned for 10 hours at 900° C. $LiMnO_2$ was used for composite "B". $LiMnO_2$, was obtained from lithium hydroxide ($LiOH.H_2O$) and manganite ($\gamma$-MnOOH) which were left for 3 hours in an air ambient maintained at a temperature of 99° C. or above and a humidity saturated to 17.05 (in kg-vapor/kg-dry air) or higher. A battery similar to embodied example 1 was made with only differences as set forth above. This battery was identified as embodied example 3.

Embodied Examples 4 to 6

Batteries similar to embodied example 3 were made except that the material of composite "A" of the embodied example 3 was replaced by $Li_{0.85}CoO_2$, $Li_{0.90}CoO_2$ and $Li_{0.98}CoO_2$ for respective examples. These batteries were identified as embodied examples 4 to 6.

Embodied Examples 7 to 9

Batteries similar to embodied example 3 were made except that the ratio by weight of composite "A" portion vs. $LiMnO_2$ portion in the embodied example 3 was changed to 98:2, 95:5, and 80:20 for respective examples. These batteries were identified as embodied examples 7 to 9.

Embodied Examples 10 and 11

The material used as composite "A" in the embodied example 3 is replaced by $Li_{0.95}Ni_{0.35}Mn_{0.35}Co_{0.3}O_2$ and $Li_{0.95}Ni_{0.40}Mn_{0.40}Co_{0.20}O_2$ for respective examples. These materials were obtained by mixing $Li_2CO_3$, $Co_3O_4$, NiO and $MnO_2$ in a variety of mixing ratios, and burning for 10 hours at 900° C. Batteries similar to embodied example 3 except for the above were made, and these batteries were named embodied examples 10 and 11.

Embodied Examples 12 and 13

The material used as composite "A" in the embodied example 3 is replaced by $Li_{0.95}Ni_{0.80}Co_{0.15}Al_{0.05}O_2$ and $Li_{0.95}Ni_{0.55}Co_{0.30}Al_{0.15}O_2$ for respective examples. These materials were obtained by mixing $Li_2CO_3$, $Co_3O_4$, NiO and $Al_3O_4$ in a variety of mixing ratios, and burning for 10 hours at 900° C. Batteries similar to embodied example 3 except for the above were made, and these batteries were named embodied examples 12 and 13.

Comparison Example 1

A battery similar to embodied example 3 was made using only $Li_{0.95}CoO_2$ as a positive electrode active material, like composite "A" in the embodied example 3, and this battery was named comparison example 1.

Comparison Example 2

A battery similar to embodied example 3 was made using only $LiMnO_2$ as a positive electrode active material as in the case of embodied example 3, and this battery was named comparison example 2.

Comparison Example 3

A battery similar to embodied example 3 was made using $LiCoO_2$ as composite "A" as in the case of embodied example 3, and this battery was named comparison example 3.

Table 1 shows specifications of the individual batteries discussed above and results of evaluations conducted in the following manner. Table 1 also shows results of evaluations made on characteristics of the batteries.

TABLE 1

|  | Compound of Composite A | Compound of Composite B | Amount of Composite B (wt-%) | 100 W Discharge Capacity (%) | Highest Temp. (° C.) | Capacity Retention Ratio (%) | Voltage at Flection Point in Discharge (V) |
|---|---|---|---|---|---|---|---|
| Example 1 | $Li_{0.95}CoO_2$ | $Li_{0.95}Ni_{0.35}Mn_{0.35}Co_{0.30}O_2$ | 10 | 95 | 75 | 65 | 3.6 |
| Example 2 | $Li_{0.95}CoO_2$ | $Li_{0.95}Ni_{0.55}Co_{0.30}Al_{0.15}O_2$ | 10 | 95 | 73 | 67 | 3.3 |
| Example 3 | $Li_{0.95}CoO_2$ | $LiMnO_2$ | 10 | 95 | 70 | 70 | 3.0 |

TABLE 1-continued

| | Compound of Composite A | Compound of Composite B | Amount of Composite B (wt-%) | 100 W Discharge Capacity (%) | Highest Temp. (°C.) | Capacity Retention Ratio (%) | Voltage at Flection Point in Discharge (V) |
|---|---|---|---|---|---|---|---|
| Example 4 | $Li_{0.85}CoO_2$ | $LiMnO_2$ | 10 | 75 | 70 | 70 | 3.0 |
| Example 5 | $Li_{0.90}CoO_2$ | $LiMnO_2$ | 10 | 95 | 70 | 70 | 3.0 |
| Example 6 | $Li_{0.98}CoO_2$ | $LiMnO_2$ | 10 | 95 | 70 | 70 | 3.0 |
| Example 7 | $Li_{0.95}CoO_2$ | $LiMnO_2$ | 2 | 96 | 74 | 65 | 3.0 |
| Example 8 | $Li_{0.95}CoO_2$ | $LiMnO_2$ | 5 | 96 | 72 | 65 | 3.0 |
| Example 9 | $Li_{0.95}CoO_2$ | $LiMnO_2$ | 20 | 92 | 67 | 75 | 3.0 |
| Example 10 | $Li_{0.95}Ni_{0.35}Mn_{0.35}Co_{0.30}O_2$ | $LiMnO_2$ | 10 | 95 | 65 | 75 | 3.0 |
| Example 11 | $Li_{0.95}Ni_{0.40}Mn_{0.40}Co_{0.20}O_2$ | $LiMnO_2$ | 10 | 95 | 65 | 75 | 3.0 |
| Example 12 | $Li_{0.95}Ni_{0.80}Co_{0.15}Al_{0.05}O_2$ | $LiMnO_2$ | 10 | 95 | 65 | 75 | 3.0 |
| Example 13 | $Li_{0.95}Ni_{0.55}Co_{0.30}Al_{0.15}O_2$ | $LiMnO_2$ | 10 | 95 | 65 | 75 | 3.0 |
| Comparison Example 1 | $Li_{0.95}CoO_2$ | — | 0 | 95 | 90 | 10 | — |
| Comparison Example 2 | — | $LiMnO_2$ | 100 | 20 | 35 | 100 | — |
| Comparison Example 3 | $LiCoO_2$ | $LiMnO_2$ | 10 | 95 | 90 | 10 | — |

Figure 2:
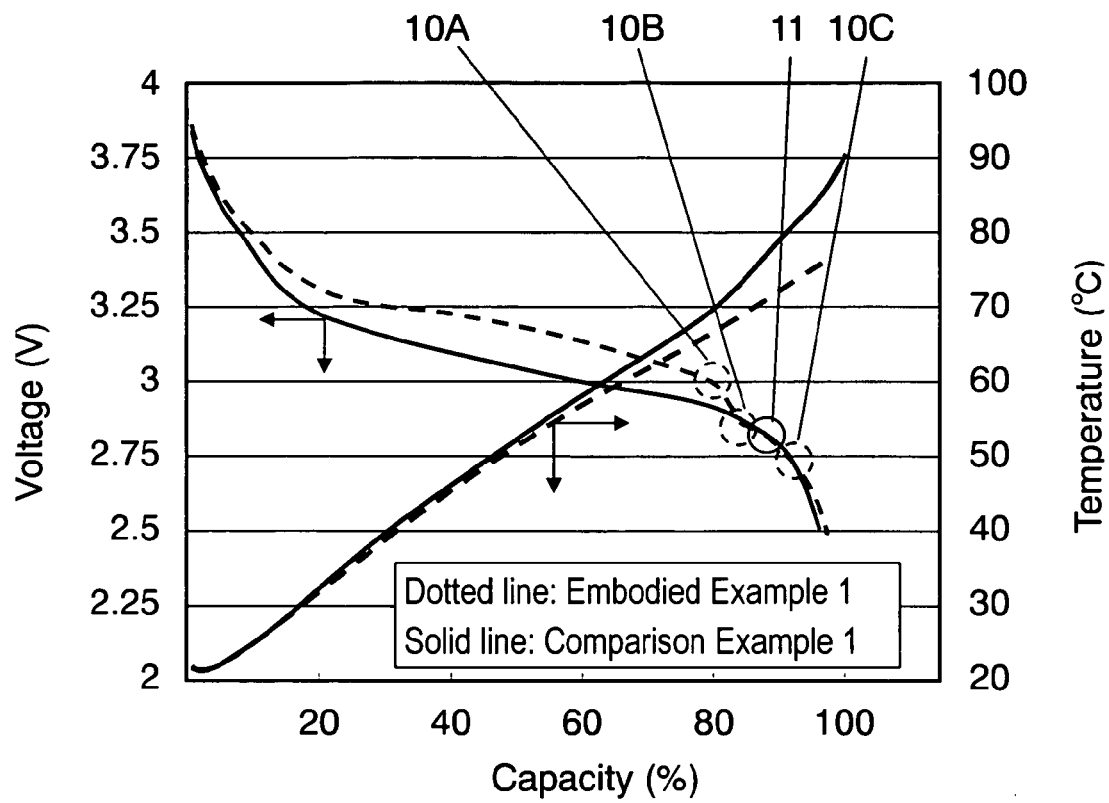
FIG. 2 is a graphical representation showing changes in discharge voltages and temperatures of an embodied example and a comparison example as they are being discharged.

First, evaluations were made for constant power discharge characteristics with a high load. In an ambient temperature of 20° C., the batteries were charged up to 4.2V with a constant current of 2.6 A, and they were further charged with the constant voltage up to the end current of 0.26 A. After an interval of 20 minutes, the batteries were discharged by drawing a constant current of 0.52 A until their voltages reached 2.0V. This was noted as a first cycle. The batteries were consecutively charged under the same conditions as the first cycle, and after an interval of 20 minutes they were again discharged for a constant output power of 100 W until their voltages reached 2.0V. This was noted as a second cycle. During these processes, the batteries were examined for their ratios of discharge capacities in the second cycle with respect to those of the first cycle, as well as their highest temperatures recorded after the end of the second cycle. Examinations were also made at the same time for flection voltages in their discharge voltage curves during discharges of the first cycle. FIG. 2 shows changes in the discharge voltages and the temperatures in the course of electrical discharge of the embodied example 1 and comparison example 1, just for examples.

Characteristics of the charge and discharge cycle were examined next. In the temperature ambient of 20° C., a charge and discharge cycles were repeated under the same condition as those of the second cycle, which was for the evaluation of a high-rate discharge characteristic. Ratios of discharge capacities in the 300th cycle with respect to those of the first cycle were recorded as capacity retention ratio.

As shown in Table 1, the batteries represented as the embodied examples 1 and 2 exhibited longer life and less heats at the end of discharges as compared to those of the comparison example 1, as they used composite "A" of $Li_{0.95}CoO_2$ having a high average discharge voltage, added with either one of the composite "B", $Li_xNi_yMn_zCo_{1-y-z}O_2$ and $Li_xNi_yCo_zAl_{1-y-z}O_2$ having a low average discharge voltage. They also exhibited larger discharge capacities as compared with comparison example 2.

The discharge curve of comparison example 1 has only one point of the step-like flection 11, as shown in FIG. 2, near the end of the electrical discharge in a range of 5% to 20% of its discharge capacity as given from the initial discharge voltage in the state of full charge to a discharge-end voltage. Flection point 11 occurs because of the steep decline in voltage near the end of electrical discharge of $Li_{0.95}CoO_2$. On the other hand, the discharge curve of embodied example 1 has three points of the step-like flection near the end of electrical discharge in a range of 5% to 20% of its discharge capacity as given from the initial discharge voltage in the state of full charge to the discharge-end voltage. The first flection point 10A occurs because of the steep decline in the voltage drop when the electrical discharge of $Li_{0.95}CoO_2$ became close to its end. The second flection point 10B shows that the discharge mechanism shifted from electrical discharge of $Li_{0.95}CoO_2$ to electrical discharge of $Li_xNi_yMn_zCo_{1-y-z}O_2$. And, the third flection point 10C occurs because of the steep decline in the voltage drop when the electrical discharge of $Li_xNi_yMn_zCo_{1-y-z}O_2$ became close to its end. There are cases in which the third flection point 10C does not occur depending on a relation among a value of the average discharge voltage of the active material having a low average discharge voltage, an amount of the added active material, and the discharge-end voltage. In this manner, it is desirable that the discharge curve has at least two points of the step-like flection near the end of electrical discharge in a range of 5% to 20% of the discharge capacity as given from the initial discharge voltage in the state of full charge to the discharge-end voltage. They can thus alleviate the temperature rise at the end of electrical discharge, as shown in FIG. 2.

In the embodied examples 3 through 13, any of the materials expressed as $Li_xCoO_2$ (where $0.9 \leq x \leq 0.98$), $Li_xNi_yMn_zCo_{1-y-z}O_2$ (where $0.9 \leq x \leq 0.98$, $0.3 \leq y \leq 0.4$, and $0.3 \leq z \leq 0.4$), and $Li_xNi_yCo_zAl_{1-y-z}O_2$ (where $0.9 \leq x \leq 0.98$, $0.55 \leq y \leq 0.8$, and $0.15 \leq z \leq 0.3$) were used as respective composite "A". These composites "A" were added with $LiMnO_2$ having the average discharge voltage as low as 2.5 to 3.0V of such an amount that it becomes 2 to 20% of the total amount of the entire active materials by weight. These batteries exhibited longer life and much less heats inside the batteries at the end of discharges as compared to those of the comparison example 1. They also exhibited larger discharge capacities as compared with the comparison example 2. Among those shown above, the embodied examples 10 and 11, which used $Li_xNi_yMn_zCo_{1-y-z}O_2$ (where $0.9 \leq x \leq 0.98$, $0.3 \leq y \leq 0.4$, and $0.3 \leq z \leq 0.4$) and embodied examples 12 and 13, which used $Li_xNi_yCo_zAl_{1-y-z}O_2$ (where $0.9 \leq x \leq 0.98$, $0.55 \leq y \leq 0.8$, and $0.15 \leq z \leq 0.3$) as their respective composite "A" exhibited superior performance in both the discharge characteristic with high load output and the charge/discharge cycle characteristic.

According to the nonaqueous electrolyte secondary battery in the exemplary embodiment of this invention, the decrease in voltage at the end of electrical discharge is alleviated, and the drastic temperature rise inside the battery due to an increase of the discharge current is alleviated. It is so considered, however, that the comparison example 2 is not suitable for such applications that require a large discharge current because its discharge voltage is too low. The embodied example 4 contained too low an amount of the element Li, which might have resulted in a small capacity due to an excessive irreversible capacity. It is thought that this has inevitably caused an increase in the discharge rate and a slight decrease in the discharge characteristic with the constant output of high load. In the case of comparison example 3, the battery capacity is determined by the battery voltage reaching the discharge-end voltage due to a rise in the negative electrode potential, and it did not provide the effect of voltage control by means of the potential change of positive electrode 2.

In the present exemplary embodiment, although what has been discussed above is the cases wherein the batteries are discharged with a constant power, the same advantage of alleviating the rise in heat at the end of discharge of composite "A" can be achieved even when the batteries are discharged with a constant current since this invention provide the effect of avoiding the composite "A" from being discharged to a low voltage potential.

INDUSTRIAL APPLICABILITY

The nonaqueous electrolyte secondary battery of the present invention is suitable for a power supply of a power tool and the like apparatus that requires a large discharge current and repeated cycle of charge and discharge since it alleviates heat inside the battery at the end of high load discharge. Hence, it provides high utility in many industrial applications.

The invention claimed is:
1. A nonaqueous electrolyte secondary battery comprising:
a positive electrode having an active material of a complex oxide capable of storing and emitting lithium ions;
a negative electrode capable of storing and emitting lithium ions;
a separator disposed between the positive electrode and the negative electrode; and
an electrolytic solution containing a nonaqueous solvent,
wherein discharge-end voltage of the nonaqueous electrolyte secondary battery is within 2.5V to 3.0V,
the positive electrode contains a positive electrode active material comprising a first active material of lithium-based complex oxide and a second active material of another lithium-based complex oxide having an average discharge voltage lower than an average discharge voltage of the first active material,
an added amount of the second active material is at least 5% and at most 20% in capacity of a total amount of capacity of the positive electrode active material, and
the first active material is a composite "A" expressed as $Li_xMO_2$, "M" denoting a 3d transition metal, x being given as $0.9 \leq x \leq 0.98$, and the second active material is $LiMnO_2$ of which average discharge voltage is within 2V to 3V.

2. The nonaqueous electrolyte secondary battery according to claim 1, wherein the composite "A" contains at least one of materials expressed as $Li_xNi_yMn_zCo_{1-y-z}O_2$, x, y, and z being given as $0.9 \leq x \leq 0.98$, $0.3 \leq y \leq 0.4$, and $0.3 \leq z \leq 0.4$, and $Li_xNi_yCo_zAl_{1-y-z}O_2$, x, y, and z being given as $0.9 \leq x \leq 0.98$, $0.55 \leq y \leq 0.8$, and $0.15 \leq z \leq 0.3$.

* * * * *